(12) United States Patent
Tomita (10) Patent No.: US 10,648,532 B2
(45) Date of Patent: May 12, 2020

(54) DAMPER DEVICE

(71) Applicant: EXEDY Corporation, Neyagawa-shi, Osaka (JP)

(72) Inventor: Yusuke Tomita, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 216 days.

(21) Appl. No.: 15/753,576

(22) PCT Filed: Sep. 14, 2016

(86) PCT No.: PCT/JP2016/077068
§ 371 (c)(1),
(2) Date: Feb. 20, 2018

(87) PCT Pub. No.: WO2017/073193
PCT Pub. Date: May 4, 2017

(65) Prior Publication Data
US 2019/0085935 A1    Mar. 21, 2019

(30) Foreign Application Priority Data

Oct. 30, 2015 (JP) .................. 2015-214031

(51) Int. Cl.
*F16F 15/123* (2006.01)
*F16D 13/68* (2006.01)
*F16H 45/02* (2006.01)

(52) U.S. Cl.
CPC ........ *F16F 15/12353* (2013.01); *F16D 13/68* (2013.01); *F16H 45/02* (2013.01); *F16D 2300/22* (2013.01); *F16F 2228/10* (2013.01)

(58) Field of Classification Search
CPC .............................. F16D 13/68; F16F 2228/10
See application file for complete search history.

(56) References Cited

U.S. PATENT DOCUMENTS 1,942,677 A * 1/1934 Wood ...................... F16D 13/68
                                                    192/209
1,977,368 A * 10/1934 Wood ...................... F16D 13/68
                                                    192/207

(Continued)

FOREIGN PATENT DOCUMENTS

CN     203257974 U    10/2013
CN     203488587 U     3/2014
(Continued)

OTHER PUBLICATIONS

International Search Report dated Nov. 15, 2016 for corresponding foreign Application No. PCT/JP2016/077068, 1 pp.

(Continued)

*Primary Examiner* — Mark A Manley
(74) *Attorney, Agent, or Firm* — United IP Counselors, LLC (57) ABSTRACT

A damper device is capable of attenuating fluctuations in torque. The damper device includes a first rotor and a second rotor rotatable relatively to the first rotor. The damper device also includes a plurality of elastic members elastically coupling the first rotor and the second rotor. The second rotor is rotatable relatively to the first rotor while held by the first rotor with use of the plurality of elastic members.

6 Claims, 7 Drawing Sheets

(56) References Cited

U.S. PATENT DOCUMENTS

| | | | | |
|---|---|---|---|---|
| 2,065,531 A | * | 12/1936 | Kerr | ............... A47K 3/284 |
| | | | | 4/612 |
| 4,475,640 A | * | 10/1984 | Takeuchi | ......... F16F 15/12353 |
| | | | | 192/213.12 |
| 2016/0208863 A1 | | 7/2016 | Fujii et al. | |

FOREIGN PATENT DOCUMENTS

| | | |
|---|---|---|
| CN | 104879438 A | 9/2015 |
| EP | 3045768 A1 | 7/2016 |
| JP | 2013-217450 A | 10/2013 |
| JP | 2015094423 A | 5/2015 |
| JP | 2015094424 A | 5/2015 |
| WO | 2015037124 A1 | 3/2017 |

OTHER PUBLICATIONS

First Office Action of the corresponding Chinese Application No. 201680057441.2, dated Apr. 1, 2019, 7 pp.

\* cited by examiner

DAMPER DEVICE

CROSS-REFERENCES TO RELATED APPLICATIONS

This application is the U.S. National Phase of PCT International Application No. PCT/JP2016/077068, filed on Sep. 14, 2016. That application claims priority to Japanese Patent Application No. 2015-214031, filed on Oct. 30, 2015. The contents of both applications are herein incorporated by reference in their entirety.

BACKGROUND

Technical Field

The present disclosure relates to a damper device, particularly to a damper device capable of attenuating fluctuations in torque.

Background Art

Well-known dynamic damper devices include a damper plate part (45), an inertia member (46) and coil springs (48a) (see Japan Laid-open Patent Application Publication No. 2015-094423). The inertia member is rotatable relatively to the damper plate part. The coil springs elastically couple the damper plate part and the inertia member in a rotational direction. For example, each coil spring is disposed in each of window parts (46a) of the inertia member and each of window parts (45a) of the damper plate part. When the inertia member is rotated relatively to the damper plate under the condition, it is possible to make the damper device smoothly operate in a range that a first rotor and a second rotor are actuated.

BRIEF SUMMARY

Figure 7:
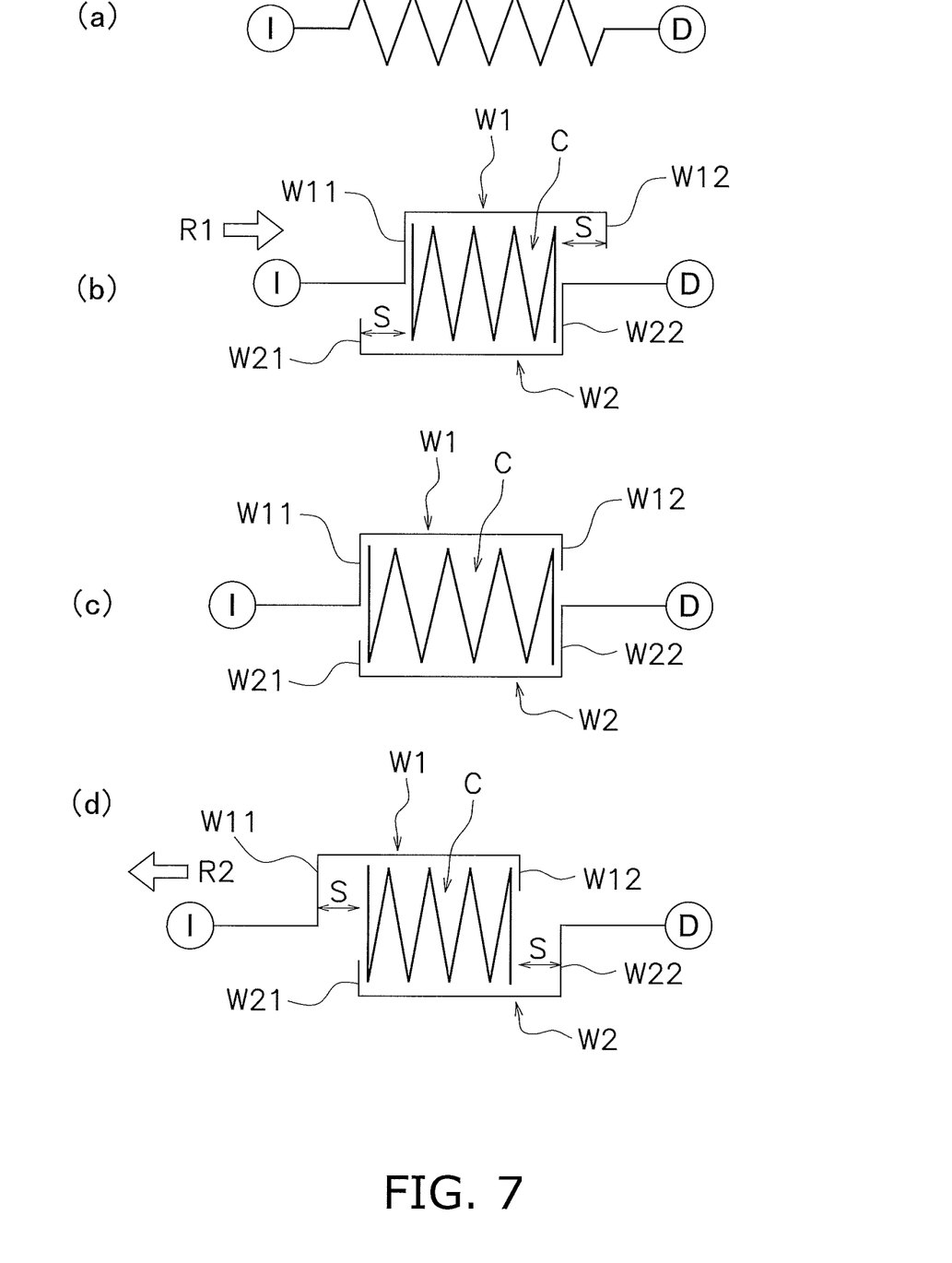
FIG. 7 is a model diagram showing actuation states of a well-known dynamic damper device.

In the well-known dynamic damper devices, as shown in a model diagram illustrated in FIG. 7(a), an inertia member I and a damper plate part D are elastically coupled through a coil spring C.

In the dynamic damper device of this type, as shown in FIG. 7(c), when a relative rotational angle between the inertia member I and the damper plate part D is zero (when a neutral state is made), both end parts of the coil spring C make contact with a pair of window walls W11 and W12, which is circumferentially opposed in a window part W1 of the inertia member I, and a pair of window walls W21 and W22, which is circumferentially opposed in a window part W2 of the damper plate part D.

As shown in FIG. 7(b), in a first rotational state that the inertia member I is rotated with respect to the damper plate part D in a first rotational direction R1, the coil spring C is compressed by one window wall W11 in the inertia member I and one window wall W22 in the damper plate part D.

In this case, a gap S is produced between one end part of the coil spring C and the window wall W12 in the inertia member I. Likewise, the gap S is also produced between the other end part of the coil spring C and the window wall W21 in the damper plate part D.

As shown in FIG. 7(d), in a second rotational state that the inertia member I is rotated with respect to the damper plate part D in a second rotational direction R2, the coil spring C is compressed by the other window wall W12 in the inertia member I and the other window wall W21 in the damper plate part D.

In this case, the gap S is produced between one end part of the coil spring C and the window wall W11 in the inertia member I. Likewise, the gap S is also produced between the other end part of the coil spring C and the window wall W22 in the damper plate part D.

The damper device, actuated as described above, goes through the neutral state in FIG. 7(c) when transitioning from the first rotational state in FIG. 7(b) to the second rotational state in FIG. 7(d). In the neutral state, the aforementioned gap S becomes zero, and collision occurs between the end parts of the coil spring C and both the window wall W12 in the inertia member I and the window wall W21 in the damper plate part D. Due to this collision, the window walls compressing the coil spring C are switched from the window walls W11 and W22 to the window walls W12 and W21.

It should be noted that the neutral state in FIG. 7(c) is similarly experienced in transition from the second rotational state in FIG. 7(d) to the first rotational state in FIG. 7(b). In this case, the window walls compressing the coil spring C are switched from the window walls W12 and W21 to the window walls W11 and W22.

Thus, in reverse of rotational directions, the parts (window walls) pressing the coil spring C are switched in the neutral state. At this time, as described above, collision occurs between the end parts of the coil spring C and the window walls. Hence, it is concerned that the damper device is hindered from smoothly operating. Additionally, it is also concerned that actuation sound is produced by this collision.

The present disclosure has been produced in view of the aforementioned drawback. It is an object of the present disclosure to provide a damper device capable of being smoothly actuated. Additionally, it is another object of the present disclosure to provide a damper device capable of lessening actuation sound. Furthermore, it is yet another object of the present disclosure to provide a damper device capable of enhancing robustness against a repetitive stress acting on an elastic member.

Solution to Problems (1) A damper device according to an aspect of the present disclosure is capable of attenuating fluctuations in torque. The present damper device includes a first rotor, a second rotor and a plurality of elastic members. The second rotor is configured to be rotatable relatively to the first rotor. The plurality of elastic members elastically couple the first rotor and the second rotor. In this damper device, the second rotor is rotatable relatively to the first rotor while being held by the first rotor with use of the plurality of elastic members.

Here, as shown in FIG. 7(a), in the well-known art, the elastic member is simply configured to elastically couple the first rotor and the second rotor. Hence, the drawback described above has occurred. By contrast, in the present damper device, the first rotor holds the second rotor with use of the plurality of elastic members (see FIG. 4(a)). Because of this, even when a rotational direction is reversed via a neutral state, switching of parts pressing the elastic members does not occur. Additionally, fluctuations in torque are attenuated by the configuration that the second rotor is rotated relatively to the first rotor while being held by the first rotor with use of the plurality of elastic members.

Thus, the present damper device can be smoothly actuated compared to the well-known damper device. Additionally, the present damper device can also lessen actuation sound compared to the well-known damper device.

Furthermore, in the present damper device, it is concerned that fatigue and so forth occur in the elastic members due to repetitive stresses acting on the elastic members. Accordingly, even when the elastic members are changed in free length and this causes variation in free length among the elastic members, the damper device can be stably actuated with the configuration that the first rotor and the second rotor are held with use of the elastic members. In other words, in the present damper device, it is possible to enhance robustness against repetitive stresses acting on the elastic members.

(2) In the damper device according to another aspect of the present disclosure, the plurality of elastic members are actuated while in compressed states between the first rotor and the second rotor. Accordingly, the first rotor can reliably hold the second rotor by expansion forces of the plurality of elastic members.

(3) In the damper device according to another aspect of the present disclosure, the plurality of elastic members elastically couple the first rotor and the second rotor such that a total deformation amount of the plurality of elastic members becomes substantially zero. In this case, for instance, when one of the plurality of elastic members is compressed while the plurality of elastic members elastically couple the first rotor and the second rotor, another of the plurality of elastic members expands whereby the total deformation amount of the plurality of elastic members becomes substantially zero. Accordingly, the first rotor can stably hold the second rotor with use of the plurality of elastic members.

(4) In the damper device according to another aspect of the present disclosure, the plurality of elastic members have an equal stiffness. Accordingly, the first rotor can stably hold the second rotor with use of the plurality of elastic members.

(5) In the damper device according to another aspect of the present disclosure, the plurality of elastic members include a first elastic member and a second elastic member. The first elastic member presses the second rotor in a first rotational direction while in contact with the first rotor. The second elastic member presses the second rotor in a second rotational direction reverse to the first rotational direction while in contact with the first rotor. Accordingly, the first rotor and the second rotor can be stably actuated, while keeping the balance between the first and second elastic members.

(6) In the damper device according to another aspect of the present disclosure, the plurality of elastic members include a first elastic member and a second elastic member. When one of the first elastic member and the second elastic member is compressed between the first rotor and the second rotor, the other of the first elastic member and the second elastic member expands between the first rotor and the second rotor. Accordingly, the first rotor and the second rotor can be stably actuated, while keeping the balance between the first and second elastic members.

(7) In the damper device according to another aspect of the present disclosure, the plurality of elastic members include a first elastic member and a second elastic member. The first rotor includes a first accommodation part, which accommodates the first elastic member, and a second accommodation part that accommodates the second elastic member. The second rotor includes a third accommodation part, which is disposed in opposition to the first accommodation part and accommodates the first elastic member, and a fourth accommodation part that is disposed in opposition to the second accommodation part and accommodates the second elastic member. The first accommodation part is offset in a first rotational direction with respect to the third accommodation part. The second accommodation part is offset in a second rotational direction reverse to the first rotational direction with respect to the fourth accommodation part.

By thus offsetting the first accommodation part and the second accommodation part, the first rotor and the second rotor can be stably actuated without switching the parts pressing the first and the second elastic members.

(8) In the damper device according to another aspect of the present disclosure, the plurality of elastic members include a first elastic member and a second elastic member. The first elastic member makes contact with the first accommodation part located inside the third accommodation part and the third accommodation part located inside the first accommodation part as seen in an axial view. The second elastic member makes contact with the second accommodation part located inside the fourth accommodation part and the fourth accommodation part located inside the second accommodation part as seen in the axial view.

By thus offsetting the first accommodation part and the second accommodation part, the first rotor and the second rotor can be stably actuated without switching the parts pressing the first and second elastic members.

According to the present disclosure, it is possible to make a damper device smoothly operate. Additionally, according to the present disclosure, it is possible to lessen actuation sound of the damper device. Furthermore, according to the present disclosure, it is possible to enhance robustness of the damper device against a repetitive stress acting on an elastic member.

DETAILED DESCRIPTION OF EMBODIMENTS

First Exemplary Embodiment (Configuration of Dynamic Damper Device)

Figure 1:
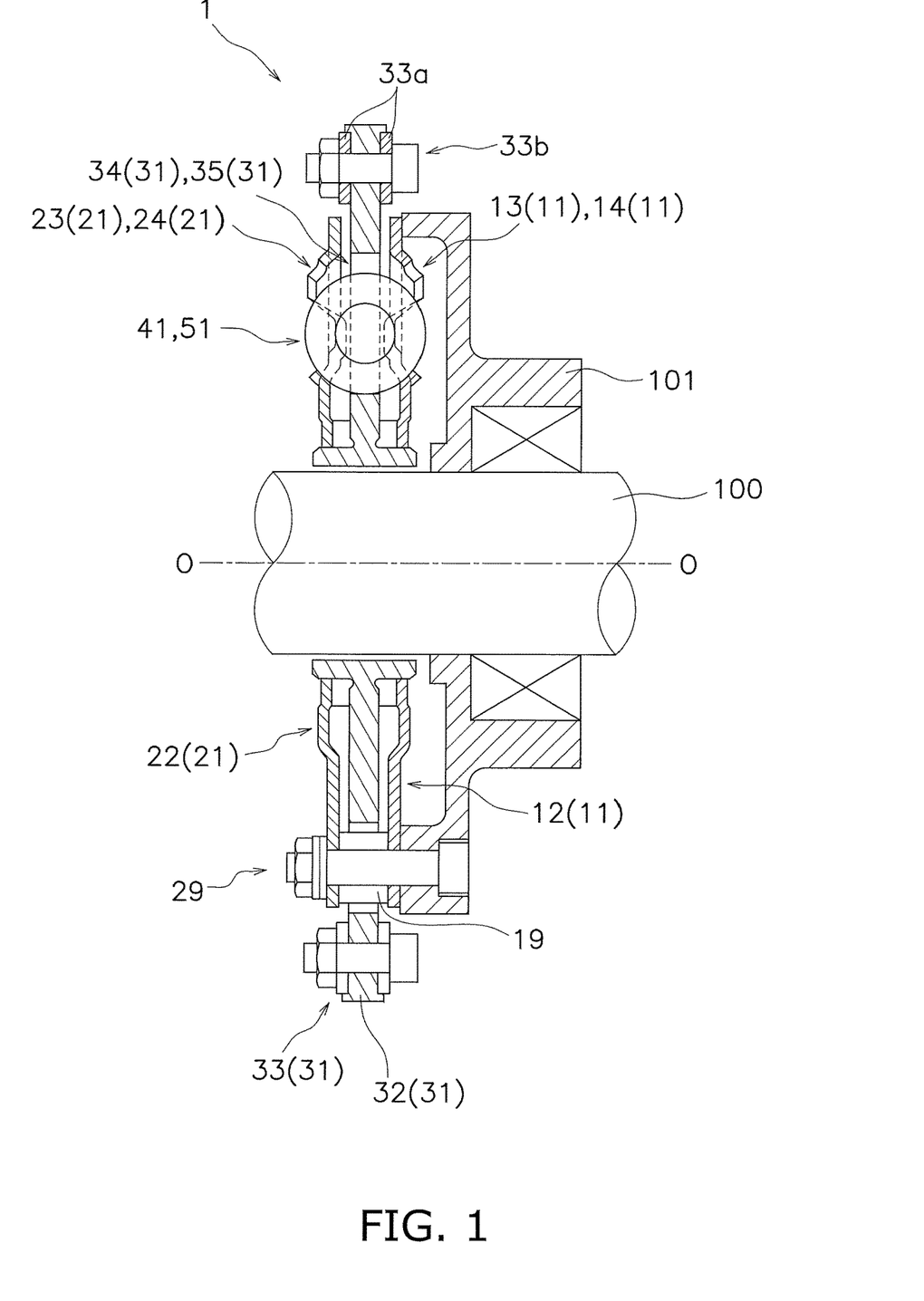
FIG. 1 is a cross-sectional view of a dynamic damper device according to a first exemplary embodiment of the present disclosure.

As shown in FIG. 1, a dynamic damper device 1 according to a first exemplary embodiment of the present disclosure is attached to a drive shaft 100. Specifically, the dynamic damper device 1 is attached to the drive shaft 100 through a coupling member 101. The coupling member 101 is attached to the drive shaft 100 while being unitarily rotatable therewith, and transmits a torque (including fluctuations in torque) of the drive shaft 100 to the dynamic damper device 1. The fluctuations in torque herein transmitted are attenuated by the dynamic damper device 1.

It should be noted that in FIG. 1, line O-O indicates a rotational axis. In the following description, a direction along the rotational axis O may be referred to as "an axial direction". Additionally, a direction separating from the rotational axis O may be referred to as "a radial direction". Furthermore, a direction about the rotational axis O may be referred to as "a circumferential direction" and/or "a rotational direction".

Figure 2:
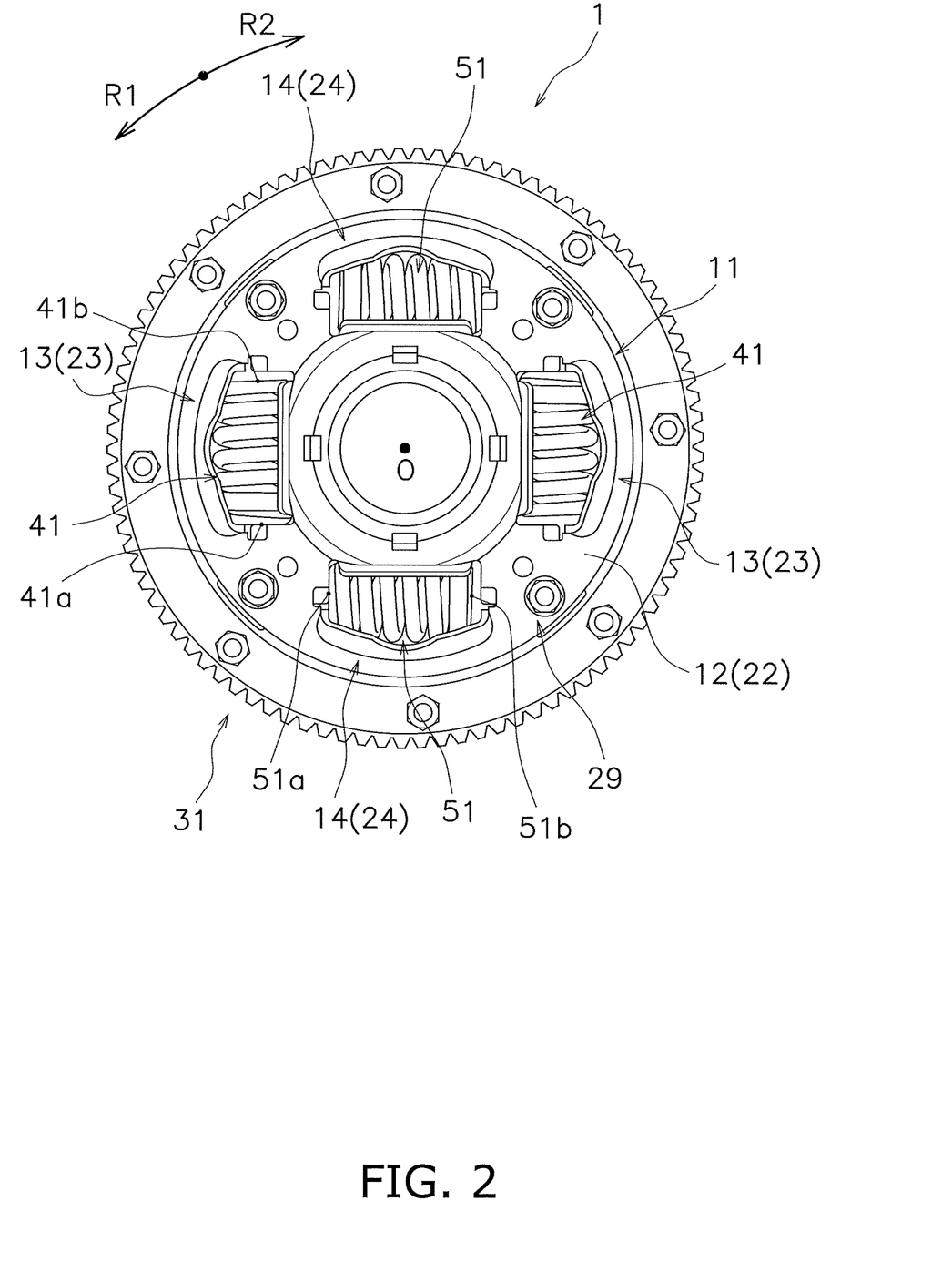
FIG. 2 is a front view of the dynamic damper device in the first exemplary embodiment.
Figure 3:
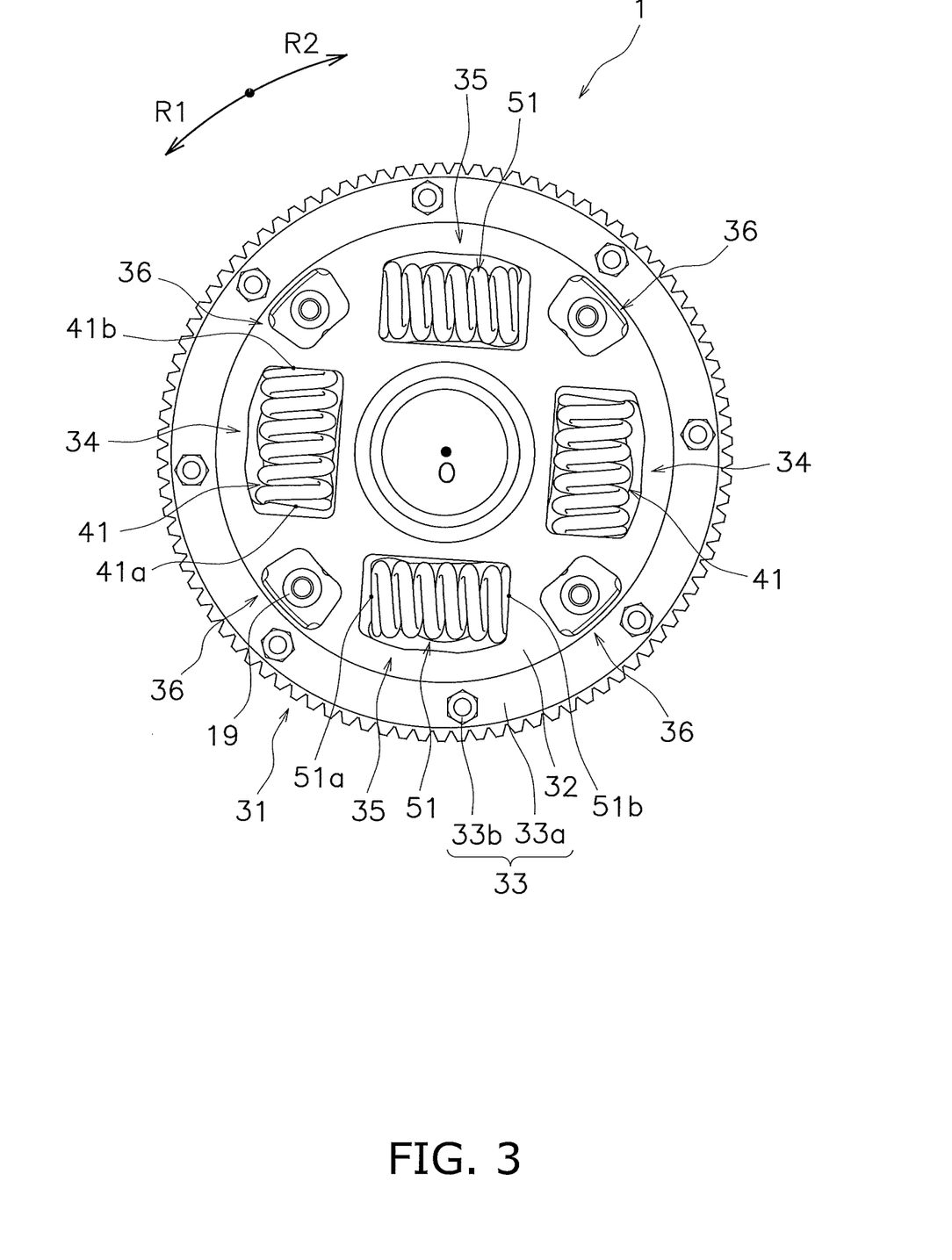
FIG. 3 is a front view of the dynamic damper device (excluding a first retaining plate) in the first exemplary embodiment.

As shown in FIGS. 1 to 3, the dynamic damper device 1 includes a first retaining plate 11, a second retaining plate 21, an inertia part 31, and a plurality of first and second coil springs 41 and 51.

The first retaining plate 11 and the second retaining plate 21 herein compose an example of a first rotor. The inertia part 31 is an example of a second rotor. Each of the first and second coil springs 41 and 51 is an example of an elastic member. Additionally, each first coil spring 41 is an example of a first elastic member, whereas each second coil spring 51 is an example of a second elastic member.

The first retaining plate 11 and the second retaining plate 21 hold the inertia part 31 with the plural first and second coil springs 41 and 51. The first retaining plate 11 and the second retaining plate 21 are disposed on both sides of the inertia part 31 in the axial direction. Additionally, the first retaining plate 11 and the second retaining plate 21 are disposed in opposition to each other in the axial direction. The first retaining plate 11 and the second retaining plate 21 are fixed to the coupling member 101 by fixation means 29, for instance, a plurality of bolts and nuts.

The first retaining plate 11 is a member disposed on the coupling member 101 side. The first retaining plate 11 is disposed between the second retaining plate 21 and the coupling member 101 in the axial direction.

As shown in FIGS. 1 and 2, the first retaining plate 11 includes a first plate body 12, a plurality of (e.g., two) first accommodation windows 13 and a plurality of (e.g., two) second accommodation windows 14. It should be noted that each first accommodation window 13 is an example of a first accommodation part, whereas each second accommodation window 14 is an example of a second accommodation part.

As shown in FIG. 2, the first plate body 12 is made in substantially the shape of an annulus. The plural first accommodation windows 13 and the plural second accommodation windows 14 are provided in the first plate body 12. The plural first accommodation windows 13 and the plural second accommodation windows 14 are disposed in alignment in the circumferential direction. Additionally, each first accommodation window 13 and each second accommodation window 14 are disposed in adjacent to each other in the circumferential direction.

For example, the plural first accommodation windows 13 and the plural second accommodation windows 14 are made in substantially the shapes of rectangles. Each first coil spring 41 is accommodated in each of the plural first accommodation windows 13, while being elastically deformable in the rotational direction. Each second coil spring 51 is accommodated in each of the plural second accommodation windows 14, while being elastically deformable in the rotational direction.

As shown in FIG. 1, the second retaining plate 21 is disposed to establish a mirror-image relation with the first retaining plate 11 with reference to a plane orthogonal to the rotational axis O. Except for this, the second retaining plate 21 has substantially the same configuration as the first retaining plate 11. Therefore, the reference signs regarding the second retaining plate 21 are denoted in parentheses in FIG. 2.

As shown in FIGS. 1 and 2, the second retaining plate 21 includes a second plate body 22, a plurality of (e.g., two) third accommodation windows 23 and a plurality of (e.g., two) fourth accommodation windows 24. It should be noted that each third accommodation window 23 is an example of the first accommodation part, whereas each fourth accommodation window 24 is an example of the second accommodation part.

The second plate body 22 is made in substantially the shape of an annulus. The second plate body 22 is disposed in opposition to the first plate body 12 in the axial direction.

Specifically, the second plate body 22 is disposed in opposition to the first plate body 12 through boss members 19 in the axial direction (see FIG. 1). The boss members 19 are disposed between the first plate body 12 and the second plate body 22, and keeps the first plate body 12 and the second plate body 22 at a predetermined interval.

The second plate body 22 is fixed together with the first plate body 12 to the coupling member 101 by the fixation means 29, for instance, the bolts and nuts. In other words, the first plate body 12 and the second plate body 22 are configured to be unitarily rotatable with the drive shaft 100 (the coupling member 101).

Specifically, the shaft part of each bolt 29 is inserted through each of bolt holes of the first plate body 12, the inner peripheral part of each boss member 19, and each of bolt holes of the second plate body 22. Then, the first plate body 12, the boss members 19 and the second plate body 22 are fixed to the coupling member 101 by the fixation means 29 (the head parts of the bolts and the nuts). It should be noted that the boss members 19 compose a stopper mechanism to be described.

The plural third accommodation windows 23 and the plural fourth accommodation windows 24 are provided in the second plate body 22. The plural third accommodation windows 23 and the plural fourth accommodation windows 24 are disposed in alignment in the circumferential direction. Additionally, each third accommodation window 23 and each fourth accommodation window 24 are disposed in adjacent to each other in the circumferential direction.

Each third accommodation window 23 is disposed in opposition to each first accommodation window 13 in the axial direction. On the other hand, each fourth accommodation window 24 is disposed in opposition to each second accommodation window 14 in the axial direction. Here, each first accommodation window 13 and each third accommodation window 23 compose a pair of accommodation windows in the axial direction. On the other hand, each second accommodation window 14 and each fourth accommodation window 24 compose a pair of accommodation windows in the axial direction.

For example, the plural third accommodation windows 23 and the plural fourth accommodation windows 24 are made in substantially the shapes of rectangles. Each first coil spring 41 is accommodated in each of the plural third accommodation windows 23, while being elastically deformable in the rotational direction. Each second coil spring 51 is accommodated in each of the plural fourth accommodation windows 24, while being elastically deformable in the rotational direction.

The inertia part 31 is configured to be rotatable with respect to the first retaining plate 11 and the second retaining plate 21. Detailedly, the inertia part 31 is configured to be rotatable relatively to the first retaining plate 11 and the second retaining plate 21, while being held by the first retaining plate 11 and the second retaining plate 21 in the rotational direction with use of the plural first and second coil springs 41 and 51.

As shown in FIG. 1, the inertia part 31 is disposed between the first retaining plate 11 and the second retaining plate 21 in the axial direction.

The inertia part 31 includes an inertia ring 32, an additional mass part 33, a plurality of (e.g., two) fifth accommodation windows 34, a plurality of (e.g., two) sixth accommodation windows 35 and a plurality of (e.g., four) restriction windows 36. It should be noted that each fifth accommodation window 34 is an example of a third accommodation part, whereas each sixth accommodation window 35 is an example of a fourth accommodation part.

As shown in FIGS. 1 and 3, the inertia ring 32 is made in substantially the shape of an annulus. The inertia ring 32 is disposed between the first plate body 12 and the second plate body 22 in the axial direction. The inertia ring 32 is configured to be rotatable relatively to the first plate body 12 and the second plate body 22. Specifically, the inertia ring 32 is held by the first plate body 12 and the second plate body 22 through the plural first and second coil springs 41 and 51.

The additional mass part 33 is attached to the outer peripheral part of the inertia ring 32. Specifically, the additional mass part 33 includes a pair of plate members 33a and fixation members 33b. The pair of plate members 33a is disposed on both sides of the inertia ring 32 in the axial direction, and is fixed to the inertia ring 32 by the fixation members 33b. Each fixation member 33b is composed of, for instance, a bolt and a nut.

The plural fifth accommodation windows 34 and the plural sixth accommodation windows 35 are provided in the inertia ring 32. The plural fifth accommodation windows 34 and the plural sixth accommodation windows 35 are disposed in alignment in the circumferential direction. Additionally, each fifth accommodation window 34 and each sixth accommodation window 35 are disposed in adjacent to each other in the circumferential direction.

As shown in FIG. 1, each fifth accommodation window 34 is disposed between and in opposition to each first accommodation window 13 and each third accommodation window 23 in the axial direction. Each sixth accommodation window 35 is disposed between and in opposition to each second accommodation window 14 and each fourth accommodation window 24 in the axial direction.

As shown in FIG. 3, each fifth accommodation window 34 is provided in the inertia ring 32 so as to be offset (or displaced) from each first accommodation window 13 and each third accommodation window 23 in the first rotational direction R1. Each sixth accommodation window 35 is provided in the inertia ring 32 so as to be offset (or displaced) from each second accommodation window 14 and each fourth accommodation window 24 in the second rotational direction R2 reverse to the first rotational direction R1.

Specifically, in FIGS. 2 and 3, the first accommodation windows 13, the third accommodation windows 23 and the fifth accommodation windows 34 are disposed in nine and three o'clock positions. On the other hand, the second accommodation windows 14, the fourth accommodation windows 24 and the sixth accommodation windows 35 are disposed in six and twelve o'clock positions.

Here, each fifth accommodation window 34 is provided in a position offset (or displaced) from each first accommodation window 13 and each third accommodation window 23 by a predetermined rotational angle in the first rotational direction R1. On the other hand, each sixth accommodation window 35 is provided in a position offset (or displaced) from each second accommodation window 14 and each fourth accommodation window 24 by a predetermined rotational angle in the second rotational direction R2.

It should be noted that FIG. 3 is a diagram showing a state that relative rotation between the inertia part 31 and both the first retaining plate 11 and the second retaining plate 21 is substantially "zero (0)", in other words, a neutral state.

For example, the plural fifth accommodation windows 34 and the plural sixth accommodation windows 35 are made in substantially the shapes of rectangles. Each first coil spring 41 is accommodated in each of the plural fifth accommodation windows 34, while being elastically deformable in the rotational direction. Each second coil spring 51 is accommodated in each of the plural sixth accommodation windows 35, while being elastically deformable in the rotational direction.

As shown in FIG. 3, the plural respective restriction windows 36 are provided in the inertia ring 32. The plural respective restriction windows 36 are disposed in alignment in the circumferential direction. Each restriction window 36 is disposed between each first accommodation window 13 and each second accommodation window 14 (each third accommodation window 23 and each fourth accommodation window 24) circumferentially adjacent to each other. For example, the plural respective restriction windows 36 are made in substantially the shape of a rectangle.

Each boss member 19 is disposed in each of the plural restriction windows 36. Each boss member 19 is circumferentially movable in the interior of each restriction window 36. Each boss member 19 is contactable to one of a pair of wall parts circumferentially opposed to each other in each restriction window 36.

For example, the shaft part of each bolt 29 is disposed in the inner peripheral part of each boss member 19 in order to fix the first retaining plate 11 and the second retaining plate 21 to the coupling member 101. In other words, the shaft part of each bolt 29 is inserted through each of the plural restriction windows 36, and each boss member 19 is disposed on the outer periphery of the shaft part of each bolt 29.

For example, when the inertia ring 32 is rotated relatively to the first retaining plate 11 and the second retaining plate 21, each boss member 19 is moved together with the shaft part of each bolt 29 in the interior of each restriction window 36. Then, when the rotational angle reaches a predetermined angle, each boss member 19 makes contact with the wall part of each restriction window 36. Accordingly, the inertia part 31 is restricted from rotating with respect to the first retaining plate 11 and the second retaining plate 21. In other words, the boss members 19 and the restriction windows 36 function as a stopper mechanism of the inertia part 31 against the first retaining plate 11 and the second retaining plate 21.

It should be noted that a configuration to provide the plural restriction windows 36 has been herein exemplified. However, the number of the restriction windows 36 can be arbitrarily set as long as at least one restriction window 36 is provided.

As shown in FIGS. 1 to 3, the plural (e.g., two) first coil springs 41 and the plural (e.g., two) second coil springs 51 elastically couple the inertia part 31 and both the first retaining plate 11 and the second retaining plate 21 in the rotational direction.

Each first coil spring 41 and each second coil spring 51 are actuated as one coil spring group. Here, two coil spring groups (two pairs of the first coil spring 41 and the second coil spring 51) are used. The first retaining plate 11 and the second retaining plate 21 hold the inertia part 31 in the rotational direction by these two coil spring groups.

Here, the stiffness of each first coil spring 41 and that of each second coil spring 51 are equal to each other. Additionally, the natural length of each first coil spring 41 and that of each second coil spring 51 are equal to each other.

While in a compressed state (a state of less than the natural length), each first coil spring 41 is disposed in both each first accommodation window 13 and each third accommodation window 23 and each fifth accommodation window 34 offset (or displaced) from the both. While in a compressed state (a state of less than the natural length), each second coil spring 51 is disposed in both each second accommodation window 14 and each fourth accommodation window 24 and each sixth accommodation window 35 offset (or displaced) from the both.

For example, one end part 41a of each first coil spring 41 makes contact with the wall part of each first accommodation window 13 and that of each third accommodation window 23 (see FIG. 2), whereas the other end part 41b of each first coil spring 41 makes contact with the wall part of each fifth accommodation window 34 offset (or displaced) from the accommodation windows 13 and 23 (see FIG. 3). One end part 51a of each second coil spring 51 (see FIG. 2) makes contact with the wall part of each second accommodation window 14 and that of each fourth accommodation window 24, whereas the other end part 51b of each second coil spring 51. (see FIG. 3) makes contact with the wall part of each sixth accommodation window 35 offset (or displaced) from the accommodation windows 14 and 24.

Here, the one end part 41a of each first coil spring 41 is an end part on the downstream side in the first rotational direction R1. The other end part 41b of each first coil spring 41 is an end part on the upstream side in the first rotational direction R1. On the other hand, the one end part 51a of each second coil spring 51 is an end part on the downstream side in the second rotational direction R2. The other end part 51b of each second coil spring 51 is an end part on the upstream side in the second rotational direction R2. Furthermore, the wall part in each of the first to sixth accommodation windows 13, 14, 23, 24, 34 and 35 is either of a pair of wall parts circumferentially opposed to each other.

More specifically, when the dynamic damper device 1 is seen in an axial direction (in an axial view shown in FIGS. 2 and 3), the one end part 41a of each first coil spring 41 makes contact with the wall part of each first accommodation window 13 and that of each third accommodation window 23, which are located in the interior of each fifth accommodation window 34. The other end part 41b of each first coil spring 41 makes contact with the wall part of each fifth accommodation window 34, which is located in the interior of each first accommodation window 13 and that of each third accommodation window 23.

Additionally, in the axial view, the one end part 51a of each second coil spring 51 makes contact with the wall part of each second accommodation window 14 and that of each fourth accommodation window 24, which are located in the interior of each sixth accommodation window 35. The other end part 51b of each second coil spring 51 makes contact with the wall part of each sixth accommodation window 35, which is located in the interior of each second accommodation window 14 and that of each fourth accommodation window 24.

With the configuration described above, in the neutral state shown in FIG. 4(c), the first coil springs 41 press the inertia part 31 in the second rotational direction R2, while making contact with the first retaining plate 11 and the second retaining plate 21. The second coil springs 51 press the inertia part 31 in the first rotational direction R1, while making contact with the first retaining plate 11 and the second retaining plate 21.

Thus, the first and second coil springs 41 and 51 hold the inertia part 31 in the rotational direction. In other words, the first retaining plate 11 and the second retaining plate 21 hold the inertia part 31 in the rotational direction with use of the first coil springs 41 and the second coil springs 51.

Additionally, as shown in FIGS. 4(b) and 4(d), when the inertia part 31 is rotated relatively to the first retaining plate 11 and the second retaining plate 21, each first coil spring 41 and each second coil spring 51 are actuated while in compressed states.

For example, each second coil spring 51 expands when each first coil spring 41 is compressed between the inertia part 31 and both the first retaining plate 11 and the second retaining plate 21 while each first coil spring 41 and each second coil spring 51 are in the compressed states (in a state of FIG. 4(b)). On the other hand, each first coil spring 41 expands when each second coil spring 51 is compressed between the inertia part 31 and both the first retaining plate 11 and the second retaining plate 21 while each first coil spring 41 and each second coil spring 51 are in the compressed states (in a state of FIG. 4(d)).

Thus, each first coil spring 41 and each second coil spring 51 expand and contract while in the compressed states. Specifically, each first coil spring 41 and each second coil spring 51 expand and contract while in the compressed states such that the total deformation amount in the plural first coil springs 41 and the plural second coil springs 51 becomes substantially zero (0).

At this time, the wall part of each first accommodation window 13 and that of each third accommodation window 23, with both of which the one end part 41a of each first coil spring 41 makes contact, are circumferentially moved in the interior of each fifth accommodation window 34. On the other hand, the wall part of each fifth accommodation window 34, with which the other end part 41b of each first coil spring 41 makes contact, is circumferentially moved in the interior of each first accommodation window 13 and that of each third accommodation window 23.

Additionally, in the axial view, the wall part of each second accommodation window 14 and that of each fourth accommodation window 24, with both of which the one end part 51a of each second coil spring 51 makes contact, are circumferentially moved in the interior of each sixth accommodation window 35. On the other hand, the wall part of each sixth accommodation window 35, with which the other end part 51b of each second coil spring 51 makes contact, is circumferentially moved in the interior of each second accommodation window 14 and that of each fourth accommodation window 24.

Thus, as shown in FIGS. 4(b), 4(c) and 4(d), the dynamic damper device 1 is configured such that an interval between the wall part of each fifth accommodation window 34 and both the wall part of each first accommodation window 13 and that of each third accommodation window 23, i.e., an interval SK, is set to be greater than zero (0). Additionally, the present dynamic damper device 1 is configured such that an interval between the wall part of each sixth accommodation window 35 and both the wall part of each second accommodation window 14 and that of each fourth accommodation window 24, i.e., the interval SK, is set to be greater than zero (0).

It should be noted that in the present exemplary embodiment, the configuration has been exemplified that the interval SK between the wall part of each fifth accommodation window 34 and both the wall part of each first accommodation window 13 and that of each third accommodation window 23 is equal to the interval SK between the wall part of each sixth accommodation window 35 and both the wall part of each second accommodation window 14 and that of each fourth accommodation window 24. However, the dynamic damper device can be configured such that both intervals are different from each other as long as each of both intervals is greater than zero (0).

(Action of Dynamic Damper Device 1)

When fluctuations in torque are inputted from the drive shaft 100 to the dynamic damper device 1 through the coupling member 101, the dynamic damper device 1 is actuated.

Specifically, the first retaining plate 11 and the second retaining plate 21 are rotated in the first rotational direction R1 or the second rotational direction R2 due to the fluctuations in torque. Accordingly, due to the fluctuations in torque, the inertia part 31 is rotated relatively to the first retaining plate 11 and the second retaining plate 21 through the plural coil springs (the plural first coil springs 41 and the plural second coil springs 51).

For example, the inertia part 31 is rotated through the plural coil springs in a direction (the second rotational direction R2 or the first rotational direction R1) reverse to the rotational direction of the first retaining plate 11 and the second retaining plate 21 (the first rotational direction R1 or the second rotational direction R2). The fluctuations in torque are attenuated by this relative rotation of the inertia part 31.

It should be noted that when the relative rotational angle of the inertia part 31 becomes a predetermined angle, for instance, when the relative rotational angle of the inertia part 31 becomes excessively large, the inertia part 31 is restricted from rotating by the stopper mechanism (the boss members 19 and the wall parts of the restriction windows 36).

When the dynamic damper device 1 is actuated as described above, each first coil spring 41 expands and contracts, while in the compressed state, between both the wall part of each first accommodation window 13 and that of each third accommodation window 23 and the wall part of each fifth accommodation window 34 offset (or displaced) from these accommodation windows 13 and 23. On the other hand, each second coil spring 51 expands and contracts, while in the compressed state, between both the wall part of each second accommodation window 14 and that of each fourth accommodation window 24 and the wall part of each sixth accommodation window 35 offset (or displaced) from these accommodation windows 14 and 24.

At this time, each first coil spring 41 and each second coil spring 51 expand and contract, while in the compressed states, within a range of less than the offset amount in the neutral state. Additionally, the inertia part 31 is rotated relatively to the first and second retaining plates 11 and 21 within a range of less than the offset amount (less than SK).

Accordingly, the inertia part 31 can be rotated relatively to the first and second retaining plates 11 and 21, while being held in the rotational direction with use of the plural first and second coil springs 41 and 51.

<Wrap-Up>

The present dynamic damper device 1 is capable of attenuating fluctuations in torque. The present dynamic damper device 1 includes both the first retaining plate 11 and the second retaining plate 21, the inertia part 31, and the plural first and second coil springs 41 and 51.

The inertia part 31 is configured to be rotatable relatively to the first retaining plate 11 and the second retaining plate 21. The plural first and second coil springs 41 and 51 elastically couple the inertia part 31 and both the first retaining plate 11 and the second retaining plate 21.

In this dynamic damper device 1, the inertia part 31 is rotatable relatively to the first retaining plate 11 and the second retaining plate 21, while being held by the first retaining plate 11 and the second retaining plate 21 with use of the plural first and second coil springs 41 and 51. Accordingly, fluctuations in torque are attenuated. Additionally, even when the rotational direction is reversed via the neutral state, switching of the parts pressing the first and second coil springs 41 and 51 does not occur.

Thus, the present dynamic damper device 1 can be smoothly actuated compared to a well-known damper device. Additionally, the present dynamic damper device 1 can also lessen actuation sound compared to the well-known damper device.

Furthermore, in the present dynamic damper device 1, it is concerned that fatigue and so forth occur in the plural first and second coil springs 41 and 51 due to repetitive stresses acting on the plural first and second coil springs 41 and 51. In other words, it is concerned that the plural first and second coil springs 41 and 51 are changed in free length. Accordingly, even when the free lengths of the plural first and second coil springs 41 and 51 vary, the dynamic damper device 1 can be stably actuated with the configuration that the first retaining plate 11 and the second retaining plate 21 hold the inertia part 31 with use of the plural first and second coil springs 41 and 51.

In other words, the first and second coil springs 41 and 51 constantly interpose and hold the inertia part 31 therebetween by the expansion force of each first coil spring 41 and that of each second coil spring 51. Hence, even when the aforementioned variation occurs, the dynamic damper device 1 can be stably actuated. Simply put, in the present dynamic damper device 1, it is possible to enhance robustness against the repetitive stresses acting on each first coil spring 41 and each second coil spring 51.

Second Exemplary Embodiment

In the first exemplary embodiment, the present advancement has been explained by taking the dynamic damper device 1 as an example of a damper device. The present disclosure is applicable not only to the dynamic damper device 1 but also to a clutch device. Therefore, in a second exemplary embodiment, the present advancement will be explained with the clutch device.

It should be noted that configurations of third and fourth coil springs 94 and 95 (to be described) in the second exemplary embodiment are substantially the same as those of the first and second coil springs 41 and 51 in the first exemplary embodiment. Additionally, configurations of seventh to twelfth accommodation windows 92a, 92b, 93a, 93b, 83c and 83d (to be described) in the second exemplary embodiment are substantially the same as those of the first to sixth accommodation windows 13, 14, 23, 24, 34 and 35 in the first exemplary embodiment.

Therefore, in the second exemplary embodiment, explanation of the third and fourth coil springs 94 and 95 and that of the seventh to twelfth accommodation windows can be omitted in some cases. The constituent elements, herein omitted in explanation, confirm to the explanation thereof in the first exemplary embodiment.

(Configuration of Clutch Device)

Figure 5:
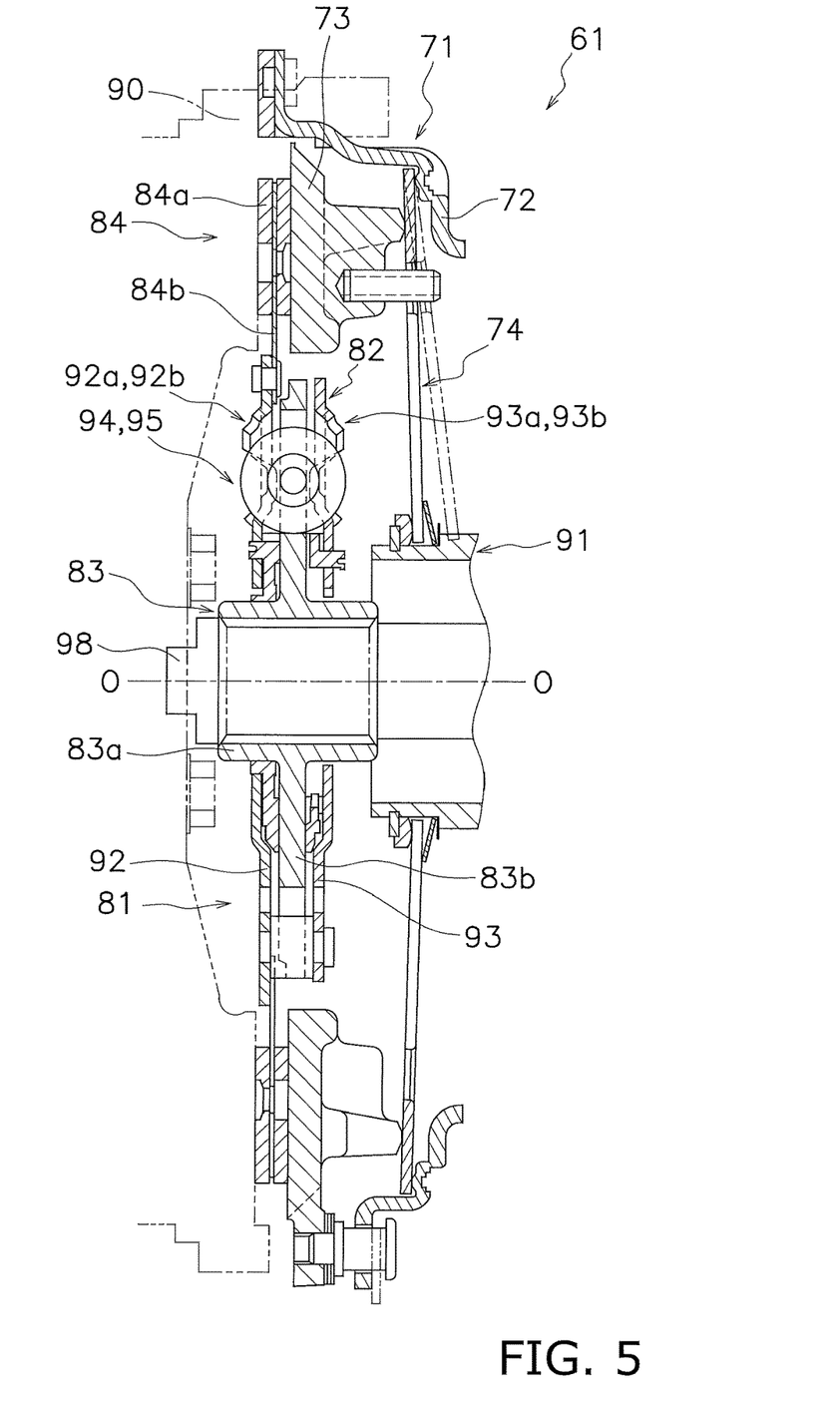
FIG. 5 is a cross-sectional view of a clutch device according to a second exemplary embodiment of the present disclosure.

A clutch device 61 according to the second exemplary embodiment of the present disclosure is disposed between an engine (not shown in the drawings) and a transmission (not shown in the drawings). As shown in FIG. 5, line O-O indicates a rotational axis. The engine is disposed on the left side in FIG. 5, whereas the transmission is disposed on the right side in FIG. 5.

Figure 6:
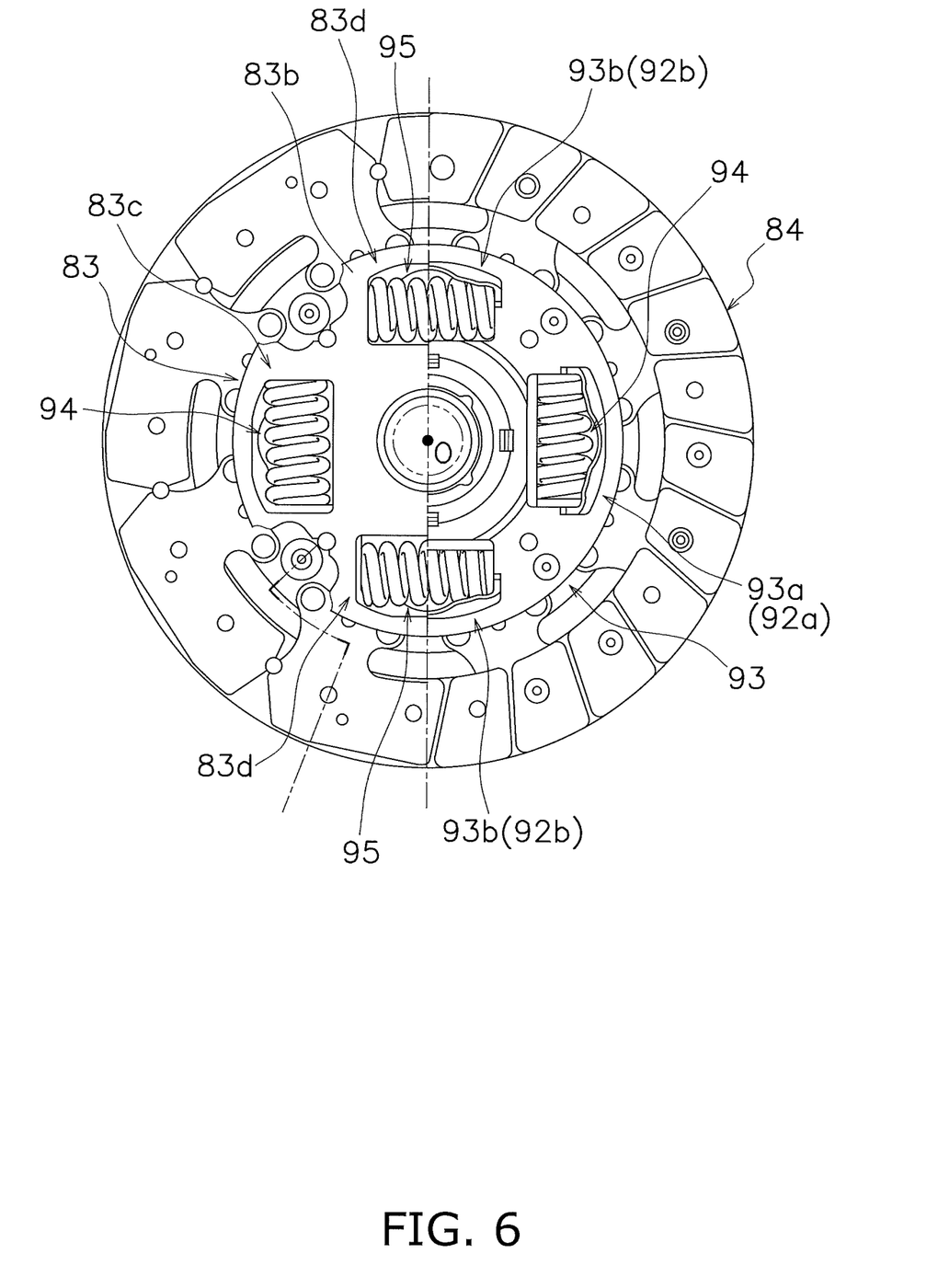
FIG. 6 is a front view of the clutch device in the second exemplary embodiment.

The clutch device 61 is a constituent element for transmitting and blocking a torque from the engine to the transmission. As shown in FIGS. 5 and 6, the clutch device 61 includes a clutch cover assembly 71 and a clutch disc assembly 81. The clutch disc assembly 81 is an example of a damper device.

As shown in FIG. 5, the clutch cover assembly 71 includes a clutch cover 72, a pressure plate 73 and a diaphragm spring 74.

The clutch cover 72 is an annular member fixed to a flywheel 90. The pressure plate 73, the diaphragm spring 74 and the clutch disc assembly 81 are accommodated in the interior of the clutch cover 72.

The pressure plate 73 is a member that interposes and holds a clutch disc 84 together with the flywheel 90 therebetween. The pressure plate 73 is made in substantially the shape of an annulus. The pressure plate 73 is provided to be non-rotatable and axially movable with respect to the clutch cover 72.

The diaphragm spring 74 is a member that urges the pressure plate 73 toward the flywheel 90. The diaphragm spring 74 is provided to be non-rotatable with respect to the clutch cover 72. Additionally, the diaphragm spring 74 is provided to be elastically deformable in the axial direction with respect to the clutch cover 72. For example, when pressed by a release device 91 in the axial direction, the diaphragm spring 74 elastically deforms in the axial direction and urges the pressure plate 73 toward the flywheel 90.

As shown in FIGS. 5 and 6, the clutch disc assembly 81 is capable of attenuating fluctuations in torque. The clutch disc assembly 81 includes a damper mechanism 82, a spline hub 83 and the clutch disc 84. The spline hub 83 is an example of a first rotor.

The damper mechanism 82 elastically couples the clutch disc 84 and the spline hub 83. The damper mechanism 82 includes a clutch plate 92, a retaining plate 93 and the plural third and fourth coil springs 94 and 95.

The clutch plate 92 and the retaining plate 93 herein compose an example of a second rotor. Each of the third and fourth coil springs 94 and 95 is an example of the elastic member. Additionally, each third coil spring 94 is an example of the first elastic member, whereas each fourth coil spring 95 is an example of the second elastic member.

The clutch plate 92 and the retaining plate 93 are disposed on both sides of a flange part 83b (to be described) of the spline hub 83 in the axial direction. Additionally, the clutch plate 92 and the retaining plate 93 are coupled to each other by fixation means such as a plurality of rivets, while being opposed to each other in the axial direction. The clutch plate 92 and the retaining plate 93 are made in substantially the shapes of annuli.

The clutch plate 92 includes a plurality of (e.g., two) seventh accommodation windows 92a and a plurality of (e.g., two) eighth accommodation windows 92b. The plural seventh accommodation windows 92a and the plural eighth accommodation windows 92b are provided in the clutch plate 92. The plural seventh accommodation windows 92a and the plural eighth accommodation windows 92b are disposed in alignment in the circumferential direction. Additionally, each seventh accommodation window 92a and each eighth accommodation window 92b are disposed in adjacent to each other in the circumferential direction.

For example, the plural seventh accommodation windows 92a and the plural eighth accommodation windows 92b are made in substantially the shapes of rectangles. Each third coil spring 94 is accommodated in each of the plural seventh accommodation windows 92a, while being elastically deformable in the rotational direction. Each fourth coil spring 95 is accommodated in each of the plural eighth accommodation windows 92b, while being elastically deformable in the rotational direction.

As shown in FIG. 5, the clutch plate 92 is disposed to establish a mirror-image relation with the retaining plate 93 with reference to a plane orthogonal to the rotational axis O. Therefore, the reference signs regarding the clutch plate 92 are denoted in parentheses in FIG. 6.

It should be noted that each seventh accommodation window 92a is an example of the first accommodation part, and is a constituent element corresponding to each first accommodation window 13 in the first exemplary embodiment. Each eighth accommodation window 92b is an example of the second accommodation part, and is a constituent element corresponding to each second accommodation window 14 in the first exemplary embodiment.

As shown in FIGS. 5 and 6, the retaining plate 93 includes a plurality of (e.g., two) ninth accommodation windows 93a and a plurality of (e.g., two) tenth accommodation windows 93b. The plural ninth accommodation windows 93a and the plural tenth accommodation windows 93b are provided in the retaining plate 93. The plural ninth accommodation windows 93a and the plural tenth accommodation windows 93b are disposed in alignment in the circumferential direction. Additionally, each ninth accommodation window 93a and each tenth accommodation window 93b are disposed in adjacent to each other in the circumferential direction.

Each ninth accommodation window 93a is disposed in opposition to each seventh accommodation window 92a in the axial direction. On the other hand, each tenth accommodation windows 93b is disposed in opposition to each eighth accommodation window 92b in the axial direction. Here, each seventh accommodation window 92a and each ninth accommodation window 93a compose a pair of accommodation windows in the axial direction. On the other hand, each eighth accommodation window 92b and each tenth accommodation window 93b compose a pair of accommodation windows in the axial direction.

For example, the plural ninth accommodation windows 93a and the plural tenth accommodation windows 93b are made in substantially the shapes of rectangles. Each third coil spring 94 is accommodated in each of the plural ninth accommodation windows 93a, while being elastically deformable in the rotational direction. Each fourth coil spring 95 is accommodated in each of the plural tenth accommodation windows 93b, while being elastically deformable in the rotational direction.

It should be noted that each ninth accommodation window 93a is an example of the first accommodation part, and is a constituent element corresponding to each third accommodation window 23 in the first exemplary embodiment. Each tenth accommodation window 93b is an example of the second accommodation part, and is a constituent element corresponding to each fourth accommodation window 24 in the first exemplary embodiment.

As shown in FIG. 5, the spline hub 83 is disposed on the outer peripheral side of an input shaft 98 of the transmission. The spline hub 83 includes a hub 83a, the flange part 83b, a plurality of (e.g., two) eleventh accommodation windows 83c and a plurality of (e.g., two) twelfth accommodation windows 83d.

The hub 83a is a tubular member extending in the axial direction. The hub 83a is spline-coupled to the input shaft 98. The flange part 83b is a part extending radially outside from the outer peripheral part of the hub 83a. The flange part 83b is made in substantially the shape of an annulus.

The plural eleventh accommodation windows 83c and the plural twelfth accommodation windows 83d are provided in the flange part 83b. The plural eleventh accommodation windows 83c and the plural twelfth accommodation windows 83d are disposed in alignment in the circumferential direction. Additionally, the plural eleventh accommodation windows 83c and the plural twelfth accommodation windows 83d are disposed in adjacent to each other in the circumferential direction.

Each eleventh accommodation window 83c is disposed between and in opposition to each seventh accommodation window 92a and each ninth accommodation window 93a in the axial direction. Each twelfth accommodation window 83d is disposed between and in opposition to each eighth accommodation window 92b and each tenth accommodation window 93b in the axial direction.

Each eleventh accommodation window 83c is disposed to be offset (or displaced) in the first rotational direction R1 with respect to each seventh accommodation window 92a and each ninth accommodation window 93a. Each twelfth accommodation window 83d is disposed to be offset (or displaced) in the second rotational direction R2 reverse to the first rotational direction R1 with respect to each eighth accommodation window 92b and each tenth accommodation window 93b.

Here, each eleventh accommodation window 83c is an example of the third accommodation part, and is a constituent element corresponding to each fifth accommodation window 34 in the first exemplary embodiment. Each twelfth accommodation window 83d is an example of the fourth accommodation part, and is a constituent element corresponding to each sixth accommodation window 35 in the first exemplary embodiment.

Therefore, regarding the aforementioned offset, the relation between each eleventh accommodation window 83c and both each seventh accommodation window 92a and each ninth accommodation window 93a is substantially the same as the relation between each fifth accommodation window 34 and both each first accommodation window 13 and each third accommodation window 23 in the first exemplary embodiment. Additionally, regarding the aforementioned offset, the relation between each twelfth accommodation window 83d and both each eighth accommodation window 92b and each tenth accommodation window 93b is substantially the same as the relation between each sixth accommodation window 35 and both each second accommodation window 14 and each fourth accommodation window 24 in the first exemplary embodiment. Because of this, these offsets regarded as conforming to explanation of the offsets in the first exemplary embodiment, and will be omitted in explanation.

For example, the plural eleventh accommodation windows 83c and the plural twelfth accommodation windows 83d are made in substantially the shapes of rectangles. Each third coil spring 94 is accommodated in each of the plural eleventh accommodation windows 83c. Each fourth coil spring 95 is accommodated in each of the plural twelfth accommodation windows 83d.

The plural (e.g., two) third coil springs 94 and the plural (e.g., two) fourth coil springs 95 couple the spline hub 83 and both the clutch plate 92 and the retaining plate 93 in the rotational direction.

Each third coil spring 94 and each fourth coil spring 95 are actuated as one coil spring group. Here, two coil spring groups (two pairs of the third coil spring 94 and the fourth coil spring 95) are used. The spline hub 83 (the flange part 83b) holds the clutch plate 92 and the retaining plate 93 in the rotational direction by these two coil spring groups.

Here, the stiffness of each third coil spring 94 and that of each fourth coil spring 95 are equal to each other. Additionally, the natural length of each third coil spring 94 and that of each fourth coil spring 95 are equal to each other.

While in a compressed state (a state of less than the natural length), each third coil spring 94 is disposed in both each seventh accommodation window 92a and each ninth accommodation windows 93a and each eleventh accommodation window 83c offset (or displaced) from the both. While in a compressed state (a state of less than the natural length), each fourth coil spring 95 is disposed in both each eighth accommodation window 92b and each tenth accommodation window 93b and each twelfth accommodation window 83d offset (or displaced) from the both.

Here, each third coil spring 94 is a constituent element corresponding to each first coil spring 41 in the first exemplary embodiment. Each fourth coil spring 95 is a constituent element corresponding to each second coil spring 51 in the first exemplary embodiment.

Therefore, the relation between the third and fourth coil springs 94 and 95 and the seventh to twelfth accommodation windows 92a, 92b, 93a, 93b, 83c and 83d is substantially the same as the relation between the first and second coil springs 41 and 51 and the first to sixth accommodation windows 13, 14, 23, 24, 34 and 35 in the first exemplary embodiment.

Figure 4:
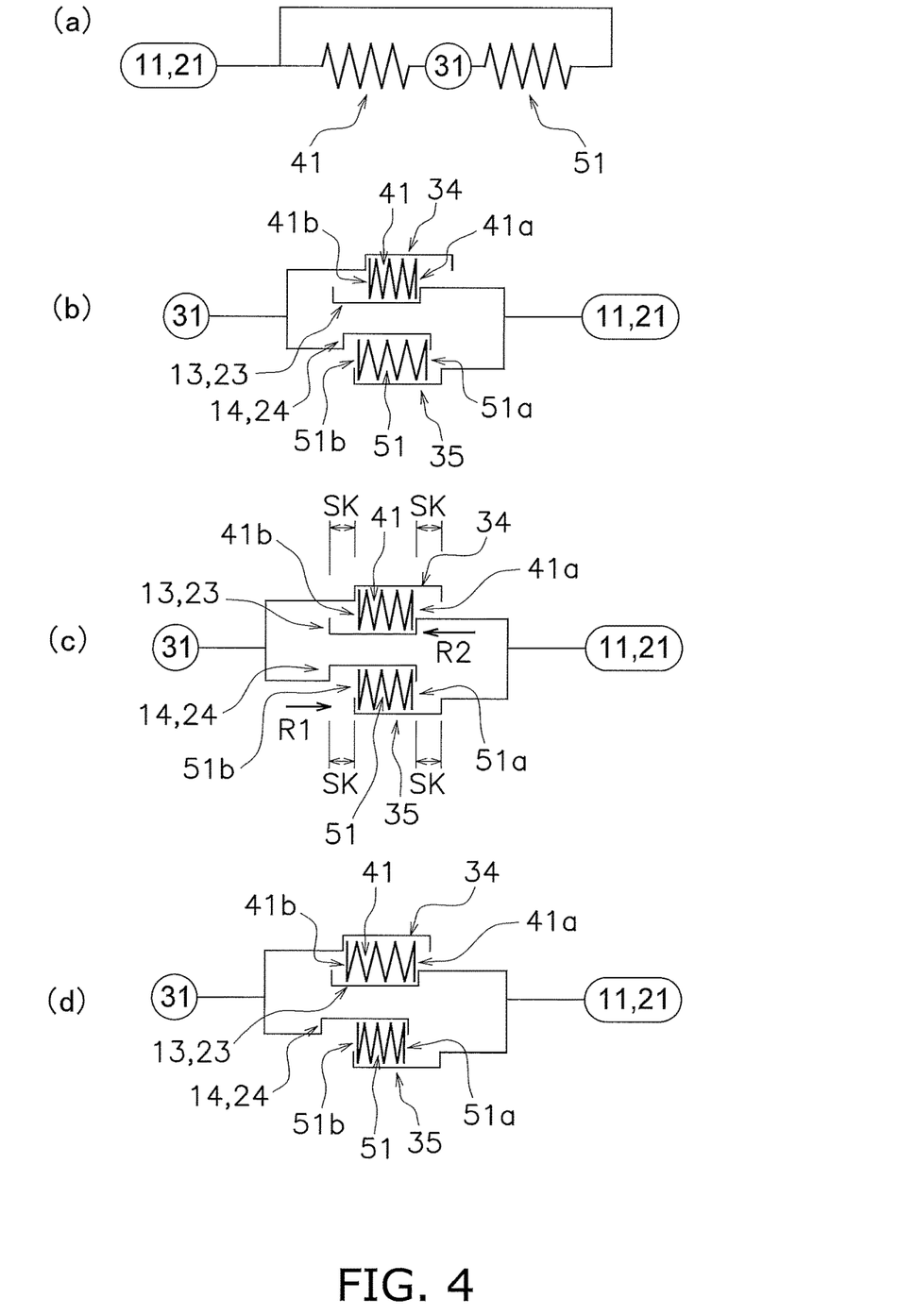
FIGS. 4(a), 4(b), 4(c), and 4(d) are model diagrams showing actuation states of the dynamic damper device in the first exemplary embodiment.

Because of this, the content explained with FIG. 4 in the first exemplary embodiment is true of the second exemplary embodiment. Therefore, this content will be omitted in explanation, and is regarded as conforming to explanation of the content in the first exemplary embodiment.

The clutch disc 84 is a constituent element for transmitting a torque from the flywheel 90 to the clutch disc assembly 81.

The clutch disc 84 is coupled to the damper mechanism 82. The clutch disc 84 includes a pair of friction facings 84a and a cushioning plate 84b.

The friction facings 84a are parts engaged by friction with the flywheel 90 and the pressure plate 73, while being interposed and held therebetween. Each friction facing 84a is made of a friction material. The friction facings 84a are attached to both sides of the cushioning plate 84b in the axial direction.

The cushioning plate 84b elastically supports the pair of friction facings 84a in the axial direction. The cushioning plate 84b is non-rotatably coupled to the damper mechanism 82. For example, the cushioning plate 84b is fixed to the outer peripheral part of the clutch plate 92 by fixation means such as a plurality of rivets.

(Action of Clutch Device 61)

When clutch engagement is released, the inner peripheral part of the diaphragm spring 74 is pulled to the transmission side (the right side in FIG. 5) by the release device 91, and the diaphragm spring 74 elastically deforms in the axial direction. Accordingly, an urging force applied to the pressure plate 73 from the diaphragm spring 74 is released. In response, the clutch disc 84 of the clutch disc assembly 81 is released from being interposed and held between the flywheel 90 and the pressure plate 73, and the engaged state of the clutch device 61 is released.

On the other hand, when clutch engagement is made, the inner peripheral part of the diaphragm spring 74 is returned to the engine side (the left side in FIG. 5) by the release device 91, and the pressure plate 73 is urged to the engine side by the elastic force of the diaphragm spring 74. Accordingly, the clutch disc 84 is interposed and held between the flywheel 90 and the pressure plate 73, and the engaged state of the clutch device 61 is made.

Here, when the engaged state of the clutch device 61 is made, fluctuations in torque are inputted to the clutch disc assembly 81. In this case, in the clutch disc assembly 81, each third coil spring 94 expands and contracts, while in a compressed state, between both the wall part of each seventh accommodation window 92a and that of each ninth accommodation window 93a and the wall part of each eleventh accommodation window 83c offset (or displaced) from these accommodation windows 92a and 93a. On the other hand, each fourth coil spring 95 expands and contracts, while in a compressed state, between both the wall part of each eighth accommodation window 92b and that of each tenth accommodation window 93b and the wall part of each twelfth accommodation window 83d offset (or displaced) from these accommodation windows 92b and 93b.

At this time, each third coil spring 94 and each fourth coil spring 95 expand and contract, while in the compressed states, within a range of less than the offset amount in the neutral state (less than SK in FIG. 4). Additionally, the clutch plate 92 and the retaining plate 93 are rotated relatively to the spline hub 83 within a range of less than the offset amount (less than SK in FIG. 4).

Accordingly, the clutch plate 92 and the retaining plate 93 can be rotated relatively to the spline hub 83 while being held in the rotational direction by the spline hub 83 with use of the plural third and fourth coil springs 94 and 95.

<Wrap-Up>

The present clutch disc assembly 81 is capable of attenuating fluctuations in torque. The present clutch disc assembly 81 includes the spline hub 83, both the clutch plate 92 and the retaining plate 93, and the plural third and fourth coil springs 94 and 95.

The clutch plate 92 and the retaining plate 93 are configured to be rotatable relatively to the spline hub 83. The plural third and fourth coil springs 94 and 95 elastically couple the spline hub 83 and both the clutch plate 92 and the retaining plate 93.

In this clutch disc assembly 81, the spline hub 83 holds the clutch plate 92 and the retaining plate 93 in the rotational direction with use of the plural third and fourth coil springs 94 and 95. In this state, the spline hub 83 rotates the clutch plate 92 and the retaining plate 93 relatively thereto. Accordingly, fluctuations in torque are attenuated. Additionally, even when the rotational direction is reversed via the neutral state, switching of the parts pressing each third coil spring 94 and each fourth coil spring 95 does not occur.

Thus, the present clutch disc assembly 81 can be smoothly actuated compared to the well-known damper device. Additionally, the present clutch disc assembly 81 can also lessen actuation sound compared to the well-known damper device.

Furthermore, in the present clutch disc assembly 81, it is concerned that fatigue and so forth occur in the plural third and fourth coil springs 94 and 95 due to repetitive stresses acting on the plural third and fourth coil springs 94 and 95. In other words, it is concerned that the plural third and fourth coil springs 94 and 95 are changed in free length. Accordingly, even when the free lengths of the plural third and fourth coil springs 94 and 95 vary, the clutch disc assembly 81 can be stably actuated with the configuration that the spline hub 83 holds the clutch plate 92 and the retaining plate 93 with use of the plural third and fourth coil springs 94 and 95.

In other words, the third and fourth coil springs 94 and 95 constantly interpose and hold the clutch plate 92 and the retaining plate 93 by the expansion forces thereof. Hence, even when the aforementioned variation occurs, the clutch disc assembly 81 can be stably actuated. In other words, in the present clutch disc assembly 81, it is possible to enhance robustness against the repetitive stresses acting on the respective third and fourth coil springs 94 and 95.

Other Exemplary Embodiments

The present disclosure is not limited to the exemplary embodiments described above, and a variety of changes or modifications can be made without departing from the scope of the present disclosure.

(a) The aforementioned exemplary embodiments have exemplified applications of the present disclosure to the dynamic damper device 1 and the clutch disc assembly 81. However, the present disclosure is also applicable to another type of damper device as long as it has a structure that a plurality of elastic members elastically couple the first rotor and the second rotor.

(b) The aforementioned exemplary embodiments have exemplified usage of two coil spring groups (two pairs of the first and second coil springs 41 and 51 or two pairs of the third and fourth coil springs 94 and 95). Alternatively to this, even in usage of one coil spring group or three or more coil spring groups, the present advancement can be realized.

(c) The aforementioned exemplary embodiments have been explained by taking both the first retaining plate 11 and the second retaining plate 21 and the spline hub 83 as examples of the first rotor. Additionally, the aforementioned exemplary embodiments have been explained by taking the inertia part 31 and both the clutch plate 92 and the retaining plate 93 as examples of the second rotor. Alternatively to this, even by considering the examples of the first rotor as the examples of the second rotor and by considering the examples of the second rotor as the examples of the first rotor, the present advancement can be realized.

(d) The aforementioned exemplary embodiments have exemplified the configuration of one coil spring group composed of the first and second coil springs 41 and 51 or the third and fourth coil springs 94 and 95. Alternatively to this, even in a configuration of one coil spring group composed of three or more coil springs, the present advancement can be realized.

REFERENCE SIGNS LIST

1 Dynamic damper device
11 First retaining plate
21 Second retaining plate
31 Inertia part
41 First coil spring
51 Second coil spring
61 Clutch device
81 Clutch disc assembly
83 Spline hub
92 Clutch plate
93 Retaining plate
94 Third coil spring
95 Fourth coil spring

The invention claimed is:

1. A damper device configured to attenuate fluctuations in torque, the damper device comprising:
a first rotor including a first accommodation part and a second accommodation part; a second rotor configured to be rotatable relative to the first rotor, the second rotor including a third accommodation part and a fourth accommodation part; and
a plurality of elastic members configured to elastically couple the first rotor and the second rotor, the plurality of elastic members including a first elastic member and a second elastic member, wherein
the second rotor is rotatable relative to the first rotor while held by the first rotor with use of the plurality of elastic members, the first accommodation part and the third accommodation part accommodate the first elastic member,
the second accommodation part and the fourth accommodation part accommodate the second elastic member,
the first accommodation part and the third accommodation part partially overlap each other when viewed along an axial direction, with the first accommodation part being offset relative to the third accommodation part in a first rotational direction, and
the second accommodation part and the fourth accommodation part partially overlap each other when viewed along the axial direction, with the second accommodation part being offset relative to the fourth accommodation part in a second rotational direction reverse to the first rotational direction,
wherein when one of the first elastic member and the second elastic member is compressed between the first rotor and the second rotor, the other of the first elastic member and the second elastic member expands between the first rotor and the second rotor.

2. The damper device according to claim 1, wherein the plurality of elastic members are actuated while in compressed states between the first rotor and the second rotor.

3. The damper device according to claim 1, wherein the plurality of elastic members elastically couple the first rotor and the second rotor such that a total deformation amount of the plurality of elastic members becomes substantially zero.

4. The damper device according to claim 1, wherein the plurality of elastic members have an equal stiffness.

5. The damper device according to claim 1, wherein
the first elastic member presses the second rotor in a first rotational direction while in contact with the first rotor, and
the second elastic member presses the second rotor in a second rotational direction reverse to the first rotational direction while in contact with the first rotor.

6. The damper device according to claim 1, wherein
the first elastic member makes contact with the first accommodation part and the third accommodation part, and
the second elastic member makes contact with the second accommodation part and the fourth accommodation part.

* * * * *